No. 792,353.

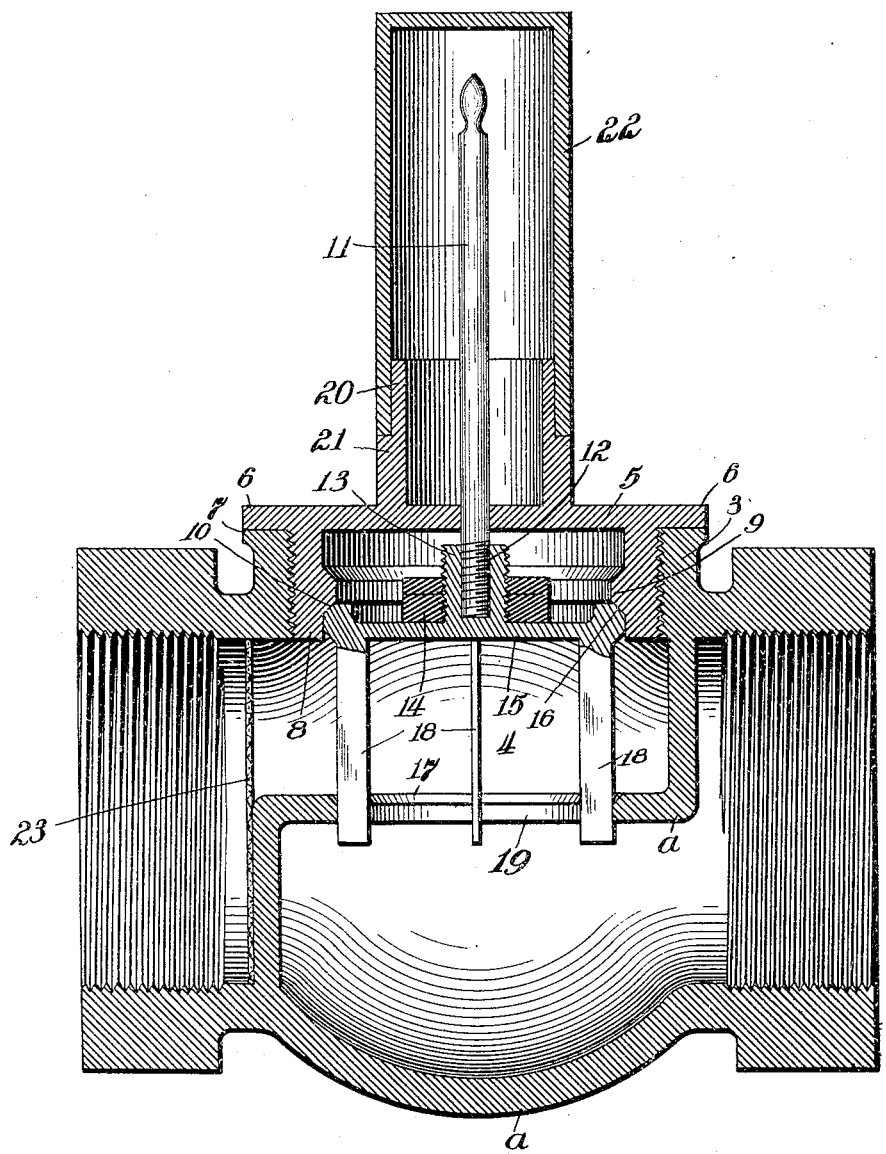

Patented June 13, 1905.

UNITED STATES PATENT OFFICE.

FRANK SCHREIDT, OF MANSFIELD, OHIO.

VALVE.

SPECIFICATION forming part of Letters Patent No. 792,353, dated June 13, 1905.

Application filed June 17, 1904. Serial No. 212,989.

*To all whom it may concern:*

Be it known that I, FRANK SCHREIDT, a citizen of the United States of America, and a resident of Mansfield, Richland county, Ohio, have invented certain new and useful Improvements in Valves, of which the following is a specification.

My invention relates to improvements in valves which will automatically prevent the flow or passage of a liquid or vapor (gas or air) when the supply is cut off from its source or the pressure reduced below a predetermined amount.

The objects of my improvements are to construct a valve in such a manner as to provide a means of keeping the valve open, permitting the admission of liquid or vapor under pressure into and egress from the valve at and above a certain predetermined pressure, and means for closing the valve automatically and preventing the passage or flow when the supply is cut off, exhausted, or the pressure reduced and keep it closed until it is opened manually. I attain these and other objects by the mechanism illustrated in the accompanying drawing, in which the figure is a vertical cross-section of an ordinary globe-valve, showing the application of my improvements thereto.

Referring to the drawing, *a* represents an ordinary globe-valve with the projecting portions at the ends interiorly threaded to receive the screw-threaded exterior of pipes of connections by means of which the liquid or vapor is conveyed to and passes through the valve. The upper portion 3 of said valve is provided with an aperture communicating with a valve-chamber 4. The inner periphery of the upper portion 3 is screw-threaded. A cap 5, having an annular flange 6 and adapted to contact with the face 7 of the upper portion 3, is provided. A depending annular flange 8, having its outer periphery screw-threaded and adapted to engage with the screw-threaded inner periphery of the upper portion 3, is made integral with the cap 5, affording a means of closing the aperture. An annular inwardly-extending rib 9 is formed on the depending flange 8 for the purpose of providing a seat 10 for the valve-face.

A valve-stem 11, having one end threaded, is fitted in an aperture formed in the center of the cap 5. The threaded end of the valve-stem is received in a screw-threaded aperture 12, provided in the boss 13, made integral with the valve. The outer periphery of the boss is screw-threaded for the purpose of receiving one or more nuts or washers 14, the purpose of which will be described more particularly hereinafter.

The valve consists of a disk having upper and lower faces 16 formed on its outer periphery and adapted to contact with the valve-seat 10 of cap 5 and the valve-seat 17 of the valve *a*. Downward-depending wings are made integral with the valve-disk fitting the aperture 19 of the valve. The wings 18 and the valve-stem 11 keep the faces of the valve in true alinement with the seats 10 and 17.

A hollow projecting portion 20 is made integral with the cap, having a square or hex 21 formed on the lower portion of its outer periphery for the purpose of screwing the cap into the valve and the upper portion is turned of such a diameter as will fit the tubular cap 22.

Reference-figure 23 designates a screen placed at the inlet of the valve.

The valve as shown and described is especially designed and constructed to be used in the consumption of natural gas; but it is obvious that it can be used for any other substance that is forced through pipes and the valve under pressure.

The operation of my valve is as follows: When gas or liquid at or above predetermined pressure is flowing through the pipes into and through the valve for consumption, the valve-disk 15 is lifted up manually by the stem 11, bringing the upper face of the disk in contact with the valve-seat 10, as shown in the drawing. The pressure of the gas or liquid is then exerted upon the bottom of the disk to keep the valve-face in close contact with the seat until such time as the supply is cut off or reduced below a predetermined pressure, when the valve-disk falls by gravity, leaving the lower face of the disk in close contact with the seat 17. The pressure of the gas or liquid is then exerted upon the top of the disk, maintaining and forcing it in close contact and closing the valve and preventing the liquid or vapor from passing through.

It will be observed that if for any reason the supply of gas, air, liquid, or any other substance conveyed to the valve under pressure for consumption or use is suddenly cut off, exhausted, or the pressure reduced below an amount previously determined upon (which is controlled by the weight of the valve-disk and its appliances) as necessary for its proper consumption and use and the supply is again replenished without warning or notice the construction of a valve as herein described affords a means for automatically closing the valve and effectually preventing the flow or passage of the substance beyond the valve and confining it within the mains or pipes until such time as the valve-disk is lifted manually from its seat, thereby insuring the absolute safety of the person and the protection of property from damages that are liable to occur in the absence of the use of a valve of the character described.

The nuts 14 are secured to the valve-disk in the manner described for the purpose of providing a means of increasing or decreasing the weight of the valve-disk and its appliances to conform to the pressure of gas or fluid it is desired to maintain as a matter of safety before the disk is permitted to fall by gravity and close the valve.

Having fully described my invention, what I desire to secure by Letters Patent is—

1. A valve having a cap made with a depending flange, an annular rib extending from the inner periphery thereof forming a valve-seat, a valve-disk having the periphery thereof forming an upper and lower seat, the upper seat adapted to contact with the annular rib forming a seat in the cap, a valve-seat formed in the valve and adapted to contact with the lower seat of the valve-disk.

2. A valve consisting of a cap having a depending flange made integral, with an annular rib extending inwardly forming a seat, a similar seat formed in the body portion of the valve in alinement with said seat, a valve-disk having a face formed on the upper and lower portion thereof and adapted to contact with said seats, and means for manually lifting said valve substantially as, and for the purpose described.

3. A valve consisting of a cap having a depending flange made integral therewith, an annular rib extending inwardly from said flange forming a valve-seat, a valve-seat provided in the body portion of the valve, a valve-disk having an upper and lower face adapted to contact with the valve-seats, means for moving said valve-face into contact with the valve-seat formed in the annular rib whereby gas or liquid is permitted to pass through said valve and maintain it in this position, the weight of the valve being sufficient to close it upon the seat in the body portion when the gas or liquid pressure admits of it, in which position it is maintained by the gas or liquid pressure exerted above it.

4. A valve consisting of a cap having an annular depending flange, an inwardly-extending rib formed on the inner periphery of said flange, a valve-disk having an upper and lower face, depending wings made integral with the said disk and adapted to keep said disk in alinement with said valve, means for increasing or decreasing the weight of said valve-disk and its appliances substantially as and for the purpose described.

5. A valve comprising a body portion, a flanged cap having an internal circumferential rib, said rib ground on its lower surface to form a valve-seat, a valve-disk having upper and lower valve-seats ground thereon, the upper valve-seat adapted to engage the seat on the rib, a valve-seat formed in the valve-body with which the lower seat on the valve-disk is adapted to engage, and wings extending from the disk through the valve-seat in the valve-body and adapted to guide and center the valve-disk in its movements.

Signed at Mansfield, Ohio, this 7th day of May, 1904.

FRANK SCHREIDT.

Witnesses:
  JOHN H. COSS,
  CHARLES E. SCHREIDT.